United States Patent
Mertz et al.

(10) Patent No.: US 6,324,002 B1
(45) Date of Patent: Nov. 27, 2001

(54) POLARIZATION-DEPENDENT IMAGING ELEMENT

(75) Inventors: Pierre H. Mertz, Mountain View; Peter R. Robrish, San Francisco, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/428,124

(22) Filed: Oct. 26, 1999

(51) Int. Cl.[7] .................................................. G02B 26/08
(52) U.S. Cl. ........................................... 359/483; 359/493
(58) Field of Search ........................................ 359/483, 493

(56) References Cited

U.S. PATENT DOCUMENTS 5,286,419 * 2/1994 Van Ligten et al. .................. 264/1.3
5,851,328 * 12/1998 Kohan .................................. 156/102

* cited by examiner

*Primary Examiner*—Georgia Epps
*Assistant Examiner*—John J. Magee

(57) ABSTRACT

An optical element constructed from a transparent support having a curved surface and a layer of a polarization-dependent film that is affixed to the curved surface. The polarization-dependent film passes linearly polarized light of a predetermined polarization while reflecting linearly polarized light having a polarization orthogonal to the predetermined polarization. The element is constructed by applying a layer of a transparent adhesive either to the layer of polarization-dependent film or to the curved surface. The support and layer of polarization-dependent film are then heated to a temperature above the temperature at which the polarization film can be deformed. The support and layer of polarization-dependent film are then pressed together so as to deform the layer of polarization-dependent film to cause the layer of polarization-dependent film to conform to the curved surface.

6 Claims, 1 Drawing Sheet

POLARIZATION-DEPENDENT IMAGING ELEMENT

FIELD OF THE INVENTION

The present invention relates to optical imaging systems, and more particularly, to an optical imaging element that transmits light of one polarization while focusing light of a second polarization.

BACKGROUND OF THE INVENTION

To simplify the following discussion, the present invention will be discussed in terms of displays utilized in head mounted computer displays; however, it will be apparent to those skilled in the art from the following discussion that the present invention may be applied to other types of displays. Head-mounted computer displays may be viewed as "eye glasses" that are worn by the user to view images created by a computer or other image source. The image seen by each eye is generated on a display screen having a two dimensional array of pixels.

It is advantageous to minimize the distance between the display and the eye of the viewer to minimize the portion of the display that extends from the viewer's face. Large overhanging displays are uncomfortable to wear. In addition, it is advantageous to be able to see around the display so the folded optical system and display should not occlude the user's vision of the surrounding view.

Prior art systems that combine reflective optics with short display to eye distances are known to the art. These systems typically utilize partially reflecting optical surfaces to fold the optical path so that the distance from the viewer's eye to the display is minimized. Such a system is described in U.S. Pat. No. 5,644,436. For such systems to operate, the direct light emitted by the display must be blocked. In addition, these systems depend on polarization filters to block light from the display from reaching the viewer's eye via direct paths.

The prior art system described above relies on partially reflecting mirrors to fold the light path. Unfortunately, such optical systems are very inefficient in terms of the fraction of the light leaving the display that actually reaches the viewer. For example, the system taught in the '436 patent only transmits $\frac{1}{16}^{th}$ of the light that leaves the display.

In principle, an optical element having a polarization-dependent coating on a curved surface could be utilized in such displays. However, constructing a polarization-dependent coating by depositing various layers on glass is not feasible. Coatings deposited on glass are isotropic, and hence, a polarization-dependent coating that operates at normal incidence cannot be made.

In addition, any such coating must reflect over a broad band of wavelengths. The preferred coatings from an efficiency point of view are multilayer dielectric coatings. However, such coating systems are too expensive. Hence, broad band reflectors are constructed from metallic coatings, which are not as efficient.

Broadly, it is the object of the present invention to provide an improved polarization-dependent reflector with optical power (curvature), which reflects light of one polarization while transmitting light of the orthogonal polarization.

It is a further object of the present invention to provide a broadband polarization-dependent curved reflector that operates at normal incidence.

These and other objects of the present invention will become apparent to those skilled in the art from the following detailed description of the invention and the accompanying drawings.

SUMMARY OF THE INVENTION

The present invention is an optical element constructed from a transparent support having a curved surface and a layer of a polarization-dependent film that is affixed to the curved surface. The polarization-dependent film passes linearly polarized light of a predetermined polarization while reflecting linearly polarized light having a polarization orthogonal to the predetermined polarization. The element is constructed by applying a layer of a transparent adhesive either to the layer of polarization-dependent film or the curved surface. The support and layer of polarization-dependent film are then heated to a temperature above the temperature at which the polarization film can be deformed. The support and layer of polarization-dependent film are then pressed together so as to deform the layer of polarization-dependent film to cause the layer of polarization-dependent film to conform to the curved surface.

DETAILED DESCRIPTION OF THE INVENTION

The present invention is based on materials that reflect light of one polarization while transmitting light of the orthogonal polarization. Such materials are known to the art. For example 3M markets such a material under the trade name DUAL BRIGHTNESS ENHANCEMENT FILM (DBEF).

In principle, a DBEF film can be thermoformed to provide a curved surface that combines the functions of a beam splitter and focusing subsystem into a single element that is compact, lightweight and inexpensive. In addition, such an element is achromatic. DBEF films can be thermoformed at temperatures of 95° C.

However, thermoforming presents two problems. First, the elements are very thin, and hence, some form of support is needed to maintain the shape of the element after thermoforming. Second, the deformed film changes shape during the process of cooling from the thermoforming temperature to room temperature. In principle, such changes in shape can be corrected by utilizing a mold that takes the cooling changes into account.

In the preferred embodiment of the present invention, these problems are overcome by deforming and bonding the film to a thin glass lens. The glass lens provides the necessary support. In addition, the bonding of the material to the lens prevents the material from changing shape during the cooling process.

Figure 1:
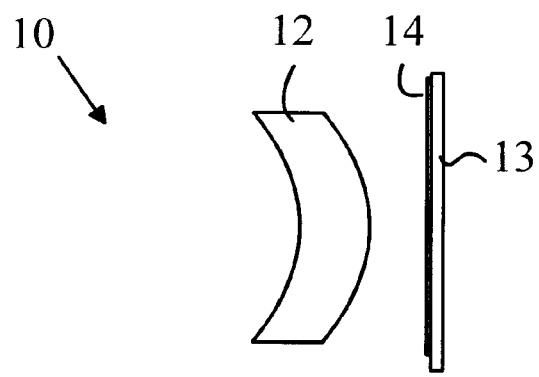
FIG. 1 illustrates the components from which an optical element in the preferred embodiment of the present invention is fabricated.
Figure 2:
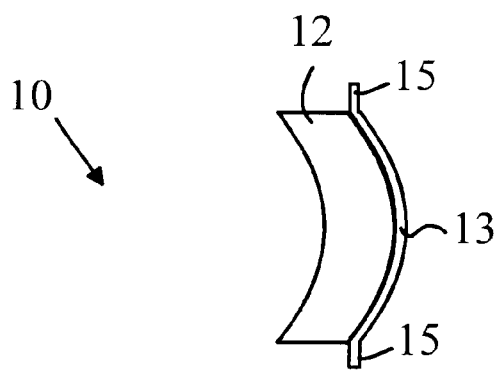
FIG. 2 illustrates the glass support 12 as pressed into film 13 so as to deform the film.
Figure 3:
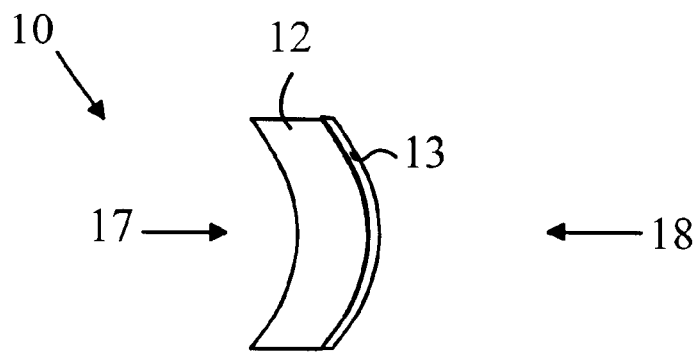
FIG. 3 illustrates the present invention after the edges 15 of the film have been trimmed to provide the coated element

Refer now to FIGS. 1–3, which illustrate the manner in which the preferred embodiment of an optical element 10 according to the present invention is fabricated. In this example, a DBEF film 13 is to be applied to a glass support element 12. A layer of transparent epoxy 14 is applied either to the film or the surface of the glass support element. A thermally or UV curable epoxy can be used. Glass support element 12 and the DBEF film 13 are then heated to approximately 80° C. Glass support 12 is then pressed into film 13 so as to deform the film as shown in FIG. 2. After the epoxy has hardened and the glass support and film have cooled, the edges 15 of the film are trimmed to provide the coated element as shown in FIG. 3.

As noted above, the DBEF film reflects light of one linear polarization while transmitting light of the orthogonal polarization. Hence, if film 13 is oriented such that light traveling in the direction shown at 18 and having a polarization P passes through the film, light traveling in the direction shown at 17 of the orthogonal polarization, S, will be reflected and focused.

While the support shown in FIGS. 1–3 is a concave-convex lens, other lens shapes can be utilized for the support. Since the optical coating provides the primary focusing of the light, a lens with weak focusing is preferred.

The above-described embodiments of the present invention utilized a glass support lens. However, it will be obvious to those skilled in the art from the preceding discussion that any transparent support that can withstand the heating can be utilized. For example, plastics such as polycarbonate may be utilized.

The above-described embodiments of the present invention utilized a transparent epoxy as the adhesive agent. However, it will be obvious to those skilled in the art from the preceding discussion that any transparent adhesive that can withstand the heating and is compatible with the support and film can be utilized.

Various modifications to the present invention will become apparent to those skilled in the art from the foregoing description and accompanying drawings. Accordingly, the present invention is to be limited solely by the scope of the following claims.

What is claimed is:

1. An optical element comprising:
    a transparent support having a curved surface; and
    a layer of a polarization-dependent film affixed to said curved surface, said polarization-dependent film passing linearly polarized light of a predetermined polarization while reflecting and focusing linearly polarized light having a polarization orthogonal to said predetermined polarization.

2. The optical element of claim 1 wherein said transparent support comprises glass.

3. The optical element of claim 1 wherein said transparent support comprises plastic.

4. A method for constructing an optical element comprising the steps of:
    providing a transparent support having a curved surface;
    providing a layer of a polarization-dependent film, said polarization-dependent film passing linearly polarized light of a predetermined polarization while reflecting and focusing linearly polarized light having a polarization orthogonal to said predetermined polarization;
    applying a layer of a transparent adhesive either to said layer of polarization-dependent film or said curved surface;
    heating said transparent support and said layer of polarization-dependent film to a temperature above the temperature at which said polarization film can be deformed; and
    pressing said support and said layer of polarization-dependent film together so as to deform said layer of polarization-dependent film to cause said layer of polarization-dependent film to conform to said curved surface.

5. The method of claim 4 wherein said transparent support comprises glass.

6. The method of claim 4 wherein said transparent support comprises plastic.

* * * * *